United States Patent
Tsutsumi et al.

(10) Patent No.: US 7,526,372 B2
(45) Date of Patent: Apr. 28, 2009

(54) STEERING CONTROL DEVICE

(75) Inventors: Junji Tsutsumi, Kanagawa (JP); Yuusuke Katou, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 500 days.

(21) Appl. No.: 11/352,832

(22) Filed: Feb. 13, 2006

(65) Prior Publication Data
US 2006/0190151 A1    Aug. 24, 2006

(30) Foreign Application Priority Data
Feb. 15, 2005  (JP)  ............................ 2005-037698

(51) Int. Cl.
*B62D 5/30* (2006.01)
*B62D 6/00* (2006.01)

(52) U.S. Cl. ........................................ 701/43; 180/405

(58) Field of Classification Search ........................ None
See application file for complete search history.

(56) References Cited

U.S. PATENT DOCUMENTS

| | | | |
|---|---|---|---|
| 6,929,086 B1 * | 8/2005 | Husain et al. ............... 180/413 |
| 7,004,279 B2 * | 2/2006 | Shitamitsu et al. .......... 180/402 |
| 7,257,475 B2 * | 8/2007 | Asaumi et al. ................ 701/43 |
| 2005/0155809 A1 * | 7/2005 | Krzesicki et al. ............ 180/407 |
| 2005/0205336 A1 * | 9/2005 | Yamasaki et al. ........... 180/402 |

* cited by examiner

*Primary Examiner*—Michael J. Zanelli
(74) *Attorney, Agent, or Firm*—Young Basile

(57) ABSTRACT

A steering control device in which a steering portion including an electric steering reaction force actuator and a steered portion including an electric steered portion actuator are mechanically disconnectable and connectable via a backup connection. Steer-by-wire control disconnects the backup connection and uses control of the steered portion actuator to set a steered angle corresponding to the steering condition and using control of the steering reaction force actuator to add a steering reaction force corresponding to the steered condition. Steering assistance control connects the backup connection and adds a steering aid force using at least one of the steering reaction force actuator and the steered portion actuator. The power supply capacity of a steered vehicle is selectively estimated and if the estimated power supply capacity reaches a predetermined value or below during the steer-by-wire control, steering is switched to the steering assistance control.

15 Claims, 8 Drawing Sheets ized with an electric route. In this type of SBW system, for example, there have been

STEERING CONTROL DEVICE

RELATED APPLICATION

The disclosure of Japanese Patent Application No. 2005-037698, filed Feb. 15, 2005 including the specification, claims and drawings thereof, is incorporated herein by reference in its entirety.

TECHNICAL FIELD

Described herein is a steering control device including a steer-by-wire system in which a steering portion having an electric steering reaction force actuator and a steered portion having an electric steered portion actuator can be mechanically disconnected and connected via backup means.

BACKGROUND

In recent years there has been proposed a steering control device for vehicles equipped with a so-called steer-by-wire system (hereinafter referred to as "SBW system"), in which a mechanical connection between a steering member, such as a steering wheel, and the steered wheel is disconnected and a part of the steering system is structured with an electric route. In this type of SBW system, for example, there have been proposals for structures such that when an abnormality is detected in the reaction force actuator, the control of the reaction force is cancelled and a mechanical backup system is activated that mechanically connects the steering member and steered wheels, and steering control is switched to control with steering assistance, thereby controlling the steering wheel actuator and functioning as a normal electric power steering (EPS) device. For example, see Laid-open Japanese Patent Application No. 2004-090783.

However, conventional devices do not recognize reduction of the power supply capacity of the vehicle as an abnormality in the SBW control system.

The present steering control device is focused on the above-description, and provides low power consumption while maintaining desirable responsive steering performance during a period of reduced power supply capacity.

More particularly, the present steering control device, in which a steering portion having an electric steering reaction force actuator and a steered portion having an electric steered portion actuator are mechanically disconnectable and connectable via backup means, includes steer-by-wire control means for disconnecting the backup means and carrying out steer-by-wire control using control of the steered portion actuator in establishing a steered angle corresponding to the steering condition and a control for the steering reaction force actuator that adds a steering reaction force that corresponds to the steered condition. Control switching means is provided for switching between steer-by-wire control and a conventional steering system. Power supply capacity estimating means is provided for estimating the power supply capacity of the vehicle. The control switching means selectively switches to conventional steering control when the power supply capacity is reduced to a predetermined value or lower during steer-by-wire control.

Therefore, in accordance with the present steering control device, when the estimated power supply capacity is reduced to a predetermined value or lower during steer-by-wire control, the control switch means switches to conventional steering control.

BRIEF DESCRIPTION OF THE DRAWINGS

These and other features and advantages of the present steering control device will be apparent from the following description and the appended claims, taken in conjunction with the accompanying drawings, in which:

DESCRIPTION OF THE ILLUSTRATED EMBODIMENT

Figure 1:
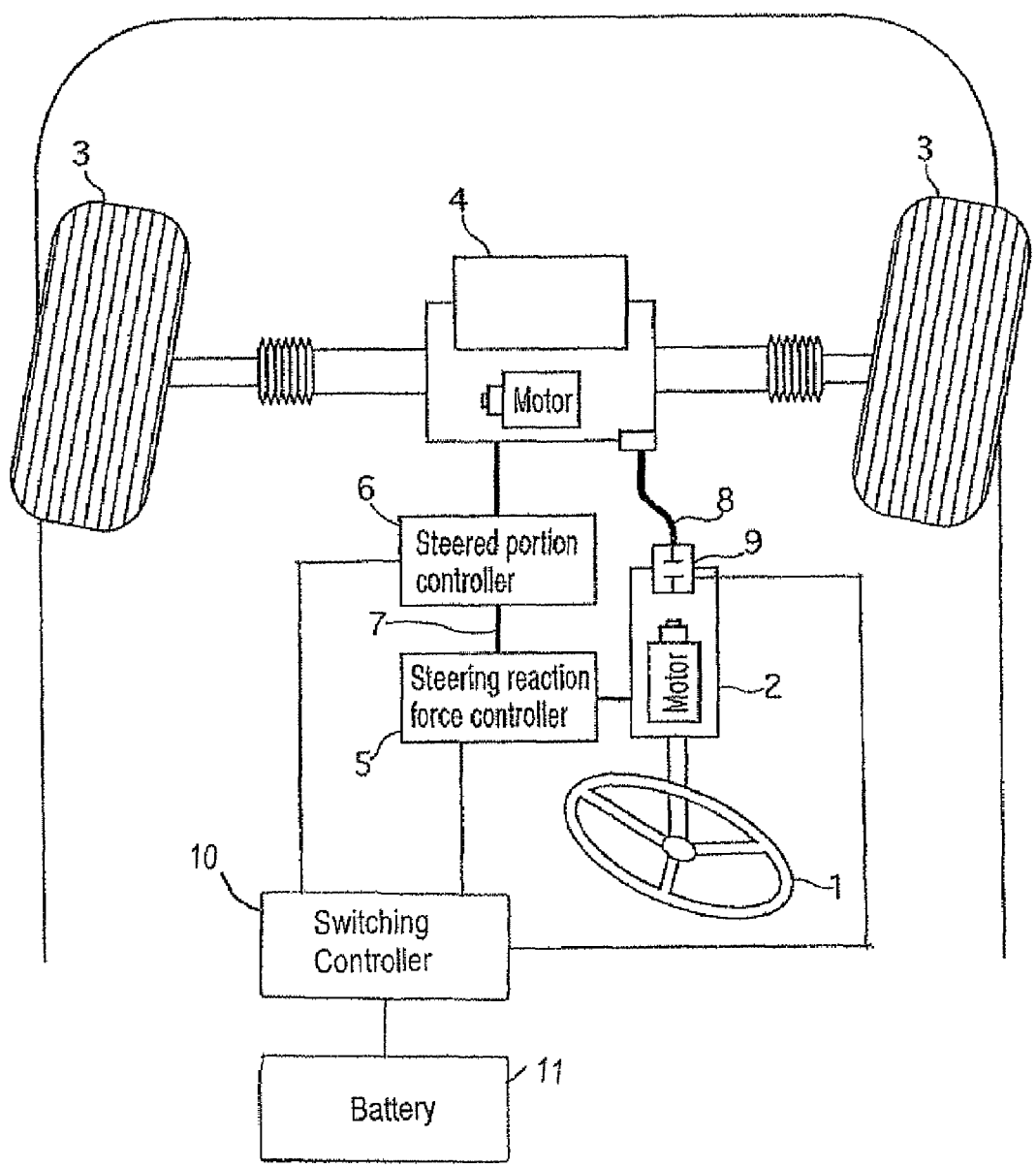
FIG. 1 is a comprehensive structural diagram showing a steer-by-wire system employing a steering control device according to an embodiment thereof.

FIG. 1 is a comprehensive structural diagram showing a steer-by-wire system (hereinafter referred as the "SBW system") that employs a steering control device according to an embodiment thereof. The SBW system, as shown in FIG. 1, comprises a steering wheel 1, a steering reaction force actuator 2, steered wheels 3, a steered portion actuator 4, a steering reaction force controller 5, a steered portion controller 6, a communication line 7, a mechanical backup system 8 (backup means), a backup clutch 9 (backup means), a switching controller 10, and battery 11.

Usually the steering wheel 1 is not connected with the steered wheels 3 mechanically. The operation condition of the steering wheel 1 is transmitted to the steered portion actuator 4 via controllers 5, 6, and contrarily, the reaction force input in the steered wheels is transmitted to the steering reaction force actuator 2. Nonetheless, a mechanical backup system 8 is provided, and the steering reaction force actuator 2 and steered portion actuator 4 can be mechanically connected, for example, by a cable, etc. Instead of a cable, connected shafts are also used. The mechanical connection can be made or broken by the backup clutch 9. The backup clutch 9 is controlled by the switching controller 10, which observes the whole steer-by-wire system, and in one embodiment including a battery 11 as a possible electrical power supply.

In the case of the SBW system having the mechanical backup system 8, operation of the steered wheels is achieved by disengaging the backup clutch 9, and driving the steered portion actuator 4 based on the command value calculated by the steered portion controller 6 in correspondence with rotational operation of the steering wheel 1. The rotational operation of the steering wheel 1 is detected from the rotational angular of the motor 2 since the axis of the motor 2 is rigidly connected with the steering wheel 1. In addition, an angular sensor is provided to detect the rotational operation of the steering wheel 1, too. The steered portion actuator 4 can comprise an electric motor, such as a brushless motor. In order to apply the steering reaction force to the steering wheel 1, the steering reaction force actuator can comprise an electric motor, such as a brushless motor, as in the case of the steered portion actuator 4. The steering reaction force operation can be achieved by driving the steering reaction force actuator 2 based on the command value calculated by the steering reaction force controller 5 in correspondence with the steered condition of the steered wheels 3. The command value calculated by the steering reaction force controller 5 and the steered portion controller 6 becomes the electric current command value for the electric motors that comprise the steering reaction force actuator 2 and the steered portion actuator 4 (steer-by-wire control means that carries out the SBW control).

Transmission of a variety of signals between the steering reaction force controller 5 and the steered portion controller 6 is performed by a communication line 7. This communication line 7 has a double-line structure. In addition, the sensor (for example, a motor rotation angle sensor, etc.) that detects the operational status of the steering reaction force actuator 2 and the steered portion actuator 4 also have a double-line structure. The steering reaction force controller 5 and the steered portion controller 6 interactively observe each other to determine whether operation is in a normal condition or in a malfunction. Furthermore, the switching controller 10 observes the steering reaction force controller 5 and the steered portion controller 6, so that a robust structure is provided for the SBW system.

In the case of the SBW system having the mechanical backup system 8, the steered wheels 3 can be directly moved in correspondence with the steering wheel 1 when the backup clutch 9 is engaged. In other words, when an abnormality is generated in the SBW system, safe driving is allowed by mechanically connecting the steering portion having the steering reaction force actuator 2 and the steered portion having the steered portion actuator 4 with the mechanical backup system 8. In addition, steering assistance control that adds an assistance force to the steering power applied by the driver can be obtained by using the steering reaction force actuator 2 or the steered portion actuator 4 (steering assistance control means that carries out the EPS control).

The illustrated embodiment proposes a control method in which, when an abnormality is found in the SBW system, the backup clutch 9 of the mechanical backup system 8 is engaged, the switch from SBW control to EPS control is maintained, and the driver is notified of the abnormality in the SBW system by an abnormality alarm lamp or the like.

Although not related to abnormality in the SBW system, when the power voltage operating the steering reaction force actuator 2 and steered portion actuator 4 is reduced, the backup clutch 9 of the mechanical backup system 8 is engaged and SBW control is switched to EPS control. Then, when the power voltage recovers, the backup clutch 9 of the mechanical backup system 8 is disengaged and the switch is made back from EPS control to SBW control.

FIGS. 2 to 5 are flowcharts that show the control switching process executed by the steering reaction force controller 5 and steered portion controller 6 according to the illustrated embodiment. This process is executed in a predetermined control cycle (for example, 10 mSec). The process for the steering reaction force controller 5 and the steered portion controller 6 are the same in principle; nonetheless, the SBW control calculation and EPS control calculation are different. Each step is described as follows (control switching means).

At step S1, the status of the EPS fixation flag is checked. If the EPS fixation flag is set, the process advances to step S24 and EPS control is effected. If it is clear (no flag), the process advances to step S2. The "EPS fixation flag" is a flag having status for effecting EPS control only, and a determination to effect EPS control only is described below.

At step S2, calculation of the power supply capacity reduction amount Vd is performed and the process advances to step S3 (power supply capacity estimation means). The "power supply capacity reduction amount Vd" is calculated using the formula:

$$Vd = \text{reference voltage} - \text{power voltage } Vbat$$

The reference voltage is set at approximately 14V.

At step S3, calculation of the steering status is performed and the process advances to step S4. Details of "calculation of the steering status" are described with reference to the flowchart of FIG. 3.

At step S3-1, absolute steering angle AbSθ and absolute steering angle speed AbSdθ are calculated.

At step S3-2, the absolute electric current command value is calculated for the electric motor comprising the steered portion actuator 4 AbS_Str_I_com.

At step S3-3, the integrated values Iθ and Idθ are calculated for the predetermined time for the absolute steering angle AbSθ and absolute steering angle speed AbSdθ using the following formula:

$$I\theta = I\theta + AbS\theta - AbS\theta 100$$

$$Id\theta = Id\theta + AbSd\theta - AbSd\theta 100$$

Wherein AbSθ100 and AbSdθ100 are the absolute steering angle AbSθ and the absolute steering angle speed AbSdθ calculated before the 100th control cycle. By adding the absolute steering angle AbSθ and the absolute steering angle speed AbSdθ, which are for the present time, and subtracting the absolute steering angle AbSθ100 and absolute steering angle speed AbSdθ100, which are calculated before the 100th cycle, the integrated values Iθ and Idθ from prior to a predetermined time are found. When the control cycle is 10 mSec, the integrated value is from one second prior; nonetheless, the number is not so limited.

At step S3-4, the integrated value Str_I is calculated for the predetermined time for the absolute electric current command value AbS_Str_I_com for the steered portion actuator 4, using the following formula:

$$Str\_I = Str\_I + AbS\_Str\_I\_com - AbS\_Str\_I\_com100$$

Wherein AbS_Str_I_com100 is an absolute electric current command value AbS_Str_I_com for the steered portion actuator 4 calculated before the 100th control cycle. By adding the absolute current control value AbS_Str_I_com, which is for the present time and subtracting the absolute electric current command value AbS_Str_I_com100 that is 100 times prior, the integrated value Str_I prior to the predetermined time is found. When the control cycle is 10 mSec the integrated value is from one second prior; nonetheless, the number is not so limited.

At step S3-5, the steering status index value Str_State, which becomes an index for the steering status, is calculated using the following formula (steering status index value detection means):

$$Str\_State = I\theta + Id\theta + Str\_I$$

Wherein the steering status index value Str_State is a value that reflects steering status from before the predetermined time and takes on a larger value when the steering angle is large and the steering speed is high. In addition, in accordance with this embodiment, the steering status index value Str_State is calculated based on the steering angle, the steering angle speed and the electric current command value for the steered portion actuator 4; nonetheless, all the values are not necessarily required to be used, and the calculation can be carried out with any single one of the values.

At step S3-6, replacement of the data element for each of the absolute steering angle AbSθ, the absolute steering angle speed AbSdθ, and the absolute electric current command value AbS_Str_I_com is carried out. In other words, the present value is made to be one (1) time prior, and the value for one (1) time prior is made to be two (2) times prior . . . , and the value for 99 times prior is made to be 100 times prior, and then they are stored in memory. An example is as follows:

$$AbS\theta100 = AbS\theta99$$
$$AbS\theta99 = AbS\theta98$$
$$AbS\theta98 = AbS\theta97$$
$$\ldots = \ldots$$
$$AbS\theta2 = AbS\theta1$$
$$AbS\theta1 = AbS\theta$$

At step S4, the first threshold value V1 and the second threshold value V2 are calculated and the process advances to step S5. This "calculation of the first threshold value V1 and the second threshold value V2" is described in detail with reference to the flowchart of FIG. 4 as follows.

At step S4-1 are found the operational status of the other systems of the vehicle (brake wire, rear wheel steering angle control, headlights, wipers, etc.) and the power consumption adjustment amount VSyS for the other systems (system operational status detection means). In accordance with this embodiment, the power consumption adjustment amount VSyS is set in two steps in correspondence with the other system conditions. When there are many operations being carried out by the other systems and power consumption is estimated to be larger, it takes on VSyS=VSyS1, and when there are only a few operations being carried out by the other systems and the power consumption is estimated to be small, it takes on VSyS=VSyS2. VSyS1 takes on, for example, 0.5V, and VSyS2 takes on, for example, 0.1V. For hybrid cars and electric cars, etc., which are equipped with a system that monitors power, the process may take more steps or no steps based on information about the battery charging capacity (battery S.O.C).

Figure 6:
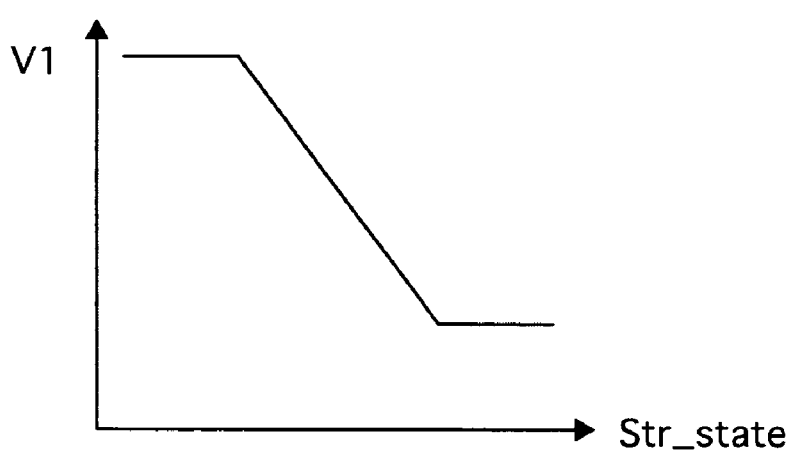
FIG. 6 is a graph showing an example of the correlation between steering status and the first threshold value.

At step S4-2, the first threshold value V1 is calculated based on the steering status index value Str_State, calculated in step S3 (first threshold value setting means). The first threshold value V1 is calculated using the characteristics shown in FIG. 6. The first threshold value V1 is a threshold value for the transition from SBW control to EPS control, and the first threshold value V1 is set at a smaller value as the steering status index value Str_State becomes greater, and therefore provides easy transition to EPS control when the steering angle is large and the steering angle speed is high.

Figure 7:
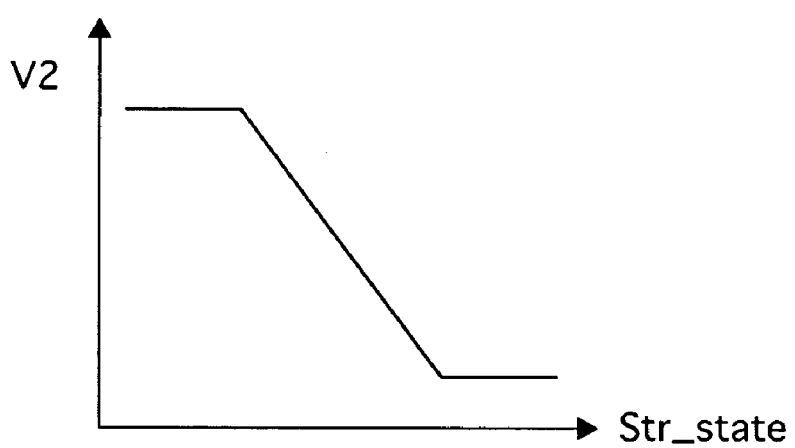
FIG. 7 is a graph showing an example of the correlation between steering status and the second threshold value.

At step S4-3, the second threshold value V2 is calculated based on the steering status index value Str_State, calculated in step S3 (second threshold value setting means). The second threshold value is calculated in accordance with the characteristics shown in FIG. 7. The second threshold value V2 is the threshold value when switched back from EPS control to SBW control and the second threshold value V2 is set to be a smaller value as the steering status index value Str_State becomes greater, and therefore it is difficult to return back to SBW control when the steering angle is large and the steering speed is high. The relationship between the first and second threshold values is V1>V2.

At step S4-4, the second threshold value V2 is adjusted using the power consumption adjustment amount VSyS of the other systems, found in step S4-1. The formula for the adjustment is as follows:

$$V2 = V2 - VsyS$$

When there are many operations being conducted by the other systems and power consumption is estimated to be large, the second threshold value V2 is adjusted in the smaller direction, and therefore it is difficult to return back from EPS control to SBW control.

At step S5, power consumption Ps during SBW control is carried out and the process advances to step S6 (power consumption estimation means). This "calculation of power consumption Ps during SBW control" is described in detail with reference to the flowchart of FIG. 5.

At step S5-1, the absolute rack shaft force value AbSFr is calculated.

At step S5-2, the integrated value F_state of the predetermined time for the absolute rack shaft force value AbSFr is calculated using the following formula (steered portion torque state index value detection means):

$$F\_state = F\_state + AbSFr - AbSFr100$$

Wherein, AbSFr100 is the absolute rack shaft force value AbSFr calculated prior to the 100th control cycle. By adding the absolute rack shaft force AbSFr at this time and subtracting the absolute rack shaft force value AbSFr100 of 100 cycles earlier, the integrated value F_state prior to the predetermined time is found. When the control cycle is 10 msec, it is an integrated value from 1 sec before; nonetheless, the number is not so limited.

At step S5-3, replacement of the data element for the absolute rack shaft force value AbSFr is carried out. In other words, the present value is made to be one (1) time prior, and the value for one (1) time prior is made to be two (2) times prior . . . , and the value for 99 times prior is made to be 100 times prior and then they are stored in memory. An example is as follows:

$$AbSFr100 = AbSFr99$$
$$AbSFr99 = AbSFr98$$
$$AbSFr98 = AbSFr97$$

-continued $$\ldots = \ldots$$
$$AbSFr2 = AbSFr1$$
$$AbSFr1 = AbSFr$$

Figure 8:
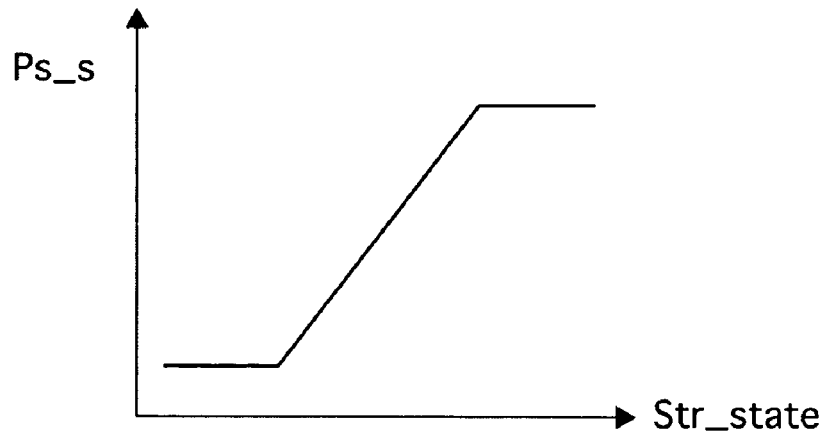
FIG. 8 is a graph showing an example of the correlation between steering status and power consumption.

At step S5-4, power consumption Ps_s is calculated based on the steering status index value Str_state, calculated in step S3. Power consumption Ps_s is calculated using the characteristics shown in FIG. 8. Power consumption Ps_s takes a larger value when the steering state index value Str_state is larger, namely when the steering angle is large and the steering speed is high.

Figure 9:
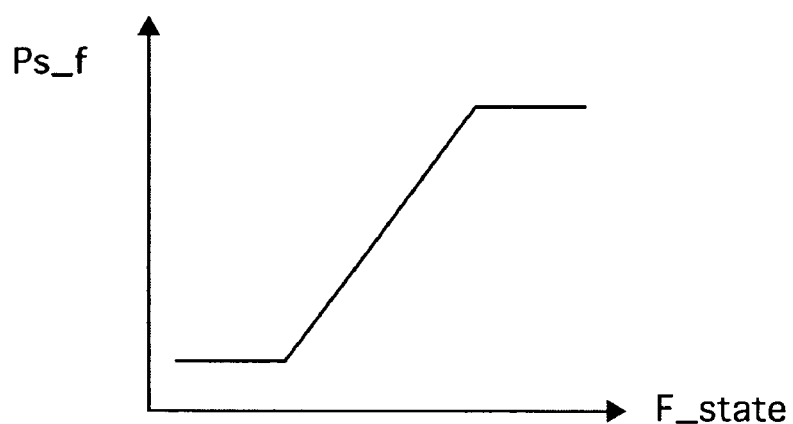
FIG. 9 is a graph showing an example of the correlation between rack shaft force status and power consumption.

At step S5-5, power consumption Ps_f is calculated based on the integral value F_state that is an index for the state of the rack shaft force calculated in step S5-2. Power consumption Ps_f is calculated using the characteristics shown in FIG. 9. Power consumption Ps_f takes a larger value when the integral value F_state is greater, namely when a substantial disturbance from the road surface affects the steered wheels 3.

At step S5-6, it is determined whether or not the system is under EPS control. If it is under EPS control, the process advances to step S5-7 and if it is not under EPS control, the process advances to step S5-10.

At step S5-7, the integrated value Str_I_EPS of the predetermined time for the absolute electric current command value AbS_Str_I_com_EP for the steered portion actuator 4 during EPS control is calculated using the following formula (electric current command status index value detection means):

$$Str\_I\_EPS = Str\_I\_EPS + AbS\_Str\_I\_com\_EPS - AbS\_Str\_I\_com\_EPS100$$

Wherein AbS_Str_I_com_EPS100 is the absolute electric current command value AbS_Str_I_com_EPS for EPS control calculated 100 control cycles ago. The integrated value Str_I_EPS from before the predetermined time can be found by adding the absolute electric current command value AbS_Str_I_com_EPS at this time and subtracting the absolute electric current command value 100 times prior. When the control cycle is 10 mSec, it is an integrated value from 1 sec before; nonetheless, the number is not so limited.

At step S5-8 replacement of the data element for the absolute electric current command value AbS_Str_I_com_EPS is carried out. In other words, the present value is made to be one (1) time prior, and the value for one (1) time prior is made to be two (2) times prior . . . , and the value for 99 times prior is made to be 100 times prior, and then they are stored in memory. An example is as follows:

$$AbS\_Str\_I\_com\_EPS100 = AbS\_Str\_I\_com\_EPS99$$
$$AbS\_Str\_I\_com\_EPS99 = AbS\_Str\_I\_com\_EPS98$$
$$AbS\_Str\_I\_com\_EPS98 = AbS\_Str\_I\_com\_EPS97$$
$$\ldots = \ldots$$
$$AbS\_Str\_I\_com\_EPS2 = AbS\_Str\_I\_com\_EPS1$$
$$AbS\_Str\_I\_com\_EPS1 = AbS\_Str\_I\_com\_EPS$$

Figure 10:
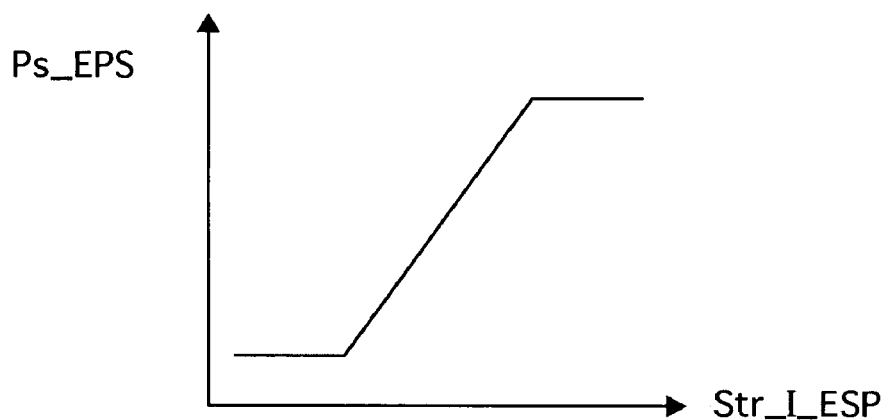
FIG. 10 is a graph showing an example of the correlation between EPS control status and power consumption.

At step S5-9, power consumption Ps_EPS is calculated based on the integrated value Str_I_EPS that indicates the electric current command value status during EPS control that was calculated in step S5-7. The larger consumption power Ps_EPS is found in the event the large electric current command value during EPS control continues. Power consumption Ps_EPS is calculated according to the characteristics shown in FIG. 10. In order to correspond to the lower power consumption during EPS control, as compared to SBW control, this characteristic has a setting such that power consumption Ps_EPS during SBW control is on the large side based on the integrated value Str_I_EPS.

At step S5-10, the stored integrated value Str_I_EPS and the absolute electric current command values AbS_Str_I_com_EPS to AbS_Str_I_com_EPS100 are cleared. In other words, these values are not calculated except during EPS control.

At step S5-11, power consumption Ps during SBW control is calculated using the following formula:

$$Ps = \max\{Ps\_s, Ps\_f, PS\_EPS\}$$

Power consumption Ps during SBW control is calculated based on the three values, which are the power consumption Ps_s estimated from the steering status, power consumption Ps_f estimated from the disturbance, and power consumption Ps_EPS estimated from the current order status during EPS control. Nonetheless, all these values are not necessarily required to be used and the calculation can be carried out with any one of the values. In addition, the rack shaft force is used for calculation of power consumption Ps_f estimated from the disturbance status; nonetheless, it can be similarly calculated using steered portion torque.

Figure 11:
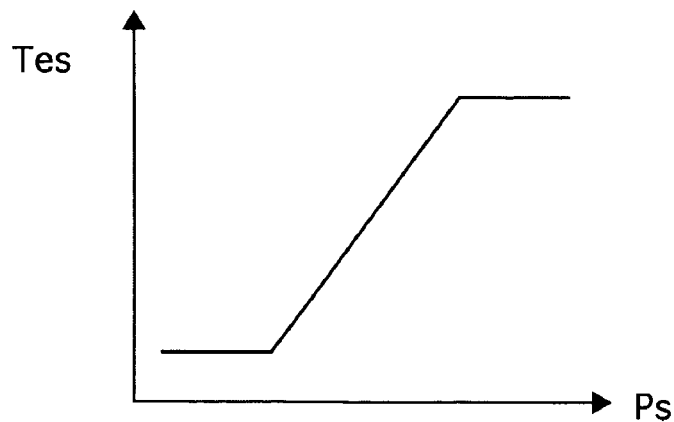
FIG. 11 is a graph showing an example of the correlation between the power consumption when using SBW, and retardation time when returned from EPS control to SBW control.

At step S6, the retardation time TeS, which is the period from the time the reduction amount of the power supply becomes the second threshold value V2 or less to the time of switching from EPS control to SBW control, is calculated based on power consumption Ps during SBW control, and then the process proceeds to step S7 (retardation time setting means). The retardation time TeS is calculated in accordance with the characteristics shown in FIG. 11. According to these characteristics, in order to make it more difficult to return back from EPS control to SBW control when power consumption Ps during SBW is larger, the retardation time TeS is set to be somewhat large.

At step S7, whether or not the system is under SBW control is determined. If it is under SBW control, the process advances to step S8, and if it is not—in other words, when it is under EPS control—the process advances to step S13.

At step S8, a comparison is made between the power supply capacity reduction amount Vd, calculated in step S2, and the first threshold value V1, calculated in step S4. When the power supply capacity reduction amount Vd is the same or greater than the first threshold value V1—in other words, the power supply capacity reduction amount is large—the process advances to step S9, and when the power supply capacity reduction amount Vd is less than the first threshold value V1, the process advances to step S12.

At step S9, the counter CT that measures the number of switches between SBW control and EPS control is incremented and the process advances to step S10 (number of control switching detection means).

At step S10, in order to switch from SBW control to EPS control, the backup clutch 9 is engaged and the process advances to step S11.

At step S11, the switch is made to the EPS control calculation and the process advances to step S21. During EPS control, in order not to activate the steering reaction force actuator 2, a calculation is not carried out by the steering reaction force controller 5 and the control command value for the steered portion actuator 4 is calculated by the steered portion controller 6. In the process from step S8 to step S11, the switching from SBW control to EPS control is carried out.

At step S12, based on a determination in step S8 that the power supply capacity reduction amount Vd is less than the first threshold value V1—in other words, the power supply capacity is not reduced—the normal SBW control calculation is continued and the process advances to step S21. During normal SBW control calculation, the control command value for the steering reaction force actuator 2 is calculated using the steering reaction force controller 5, and the control command value for the steered portion actuator 4 is calculated using the steered portion controller 6.

At step S13, following a determination in step S7 that the system is under EPS control, a comparison is made between the power supply capacity reduction amount Vd, calculated in step S2, and the second threshold value V2, calculated in step S4. When the power supply capacity reduction amount Vd is the same or less than the second threshold value V2—in other words, the power supply capacity reduction amount is small—the process advances to step S14, and when the power supply capacity reduction amount Vd is greater than the second threshold value V2, the process advances to step S19.

At step S14, a comparison is made between the elapsed time CeS from the point when the power supply capacity reduction amount Vd became the second threshold or less and the retardation time TeS configured in step S6, which is the time of the switch back from EPS control to SBW control. When CeS≦TeS the process advances to step S15, and when CeS>TeS, the process advances to step S16.

At step S15, the elapsed time CeS when the power supply capacity reduction amount Vd becomes the same as or less than the second threshold value V2 is incremented and the process advances to step S20. Therefore, even if the power supply capacity reduction amount Vd becomes the same as or less than the second threshold value V2, EPS control continues until it exceeds the retardation time TeS.

At step S16, following a determination that CeS>TeS, the counter CT that measures the number of switches between SBW control and EPS control is incremented and the process advances to step S17 (number of control switching detection means).

At step S17, the backup clutch 9 is disengaged in order to return back from EPS control to SBW control, and the process advances to step S18.

At step S18, the switch is made to the SBW control calculation and the process advances to step S21. In the SBW control calculation, the control command value for the steering reaction force actuator 2 is calculated by the steering reaction force controller 5 and the control command value for the steered portion actuator 4 is calculated by the steered portion controller 6. In the process from step S13 to step S18, switching back from EPS control to SBW control is carried out.

At step S19, following a determination in step S13 that the power supply capacity reduction amount Vd is the same as or larger than the second threshold value V2, the elapsed time CeS from the point when the power supply capacity reduction amount Vd becomes the same as or less than the second threshold value V2 is cleared and the process advances to step S20.

At step S20, in order to continue the EPS control, the calculation is not carried out by the steering reaction force controller 5, and the control command value for the steered portion actuator 4 is calculated by the steered portion controller 6 and the process advances to step S21.

At step S21, following the EPS control calculation at steps S11 or S20, or the SBW control calculation at steps S12 or step S18, it is determined whether or not the timer TO passed the predetermined time Th. The predetermined time Th is a value set in advance (for example, one (1) minute) and if switching between SBW control and EPS control frequently occurs within this predetermined time Tb, it is determined that the deterioration of the battery may be accelerated. If the predetermined time Th is not passed, the process advances to step S22, and if the predetermined time Th is passed, the process advances to step S26.

At step S22, a comparison is made between the counter CT for the number of switches between SBW control and EPS control counted in step S9 or step S16, and the predetermined number Cb set in advance (for example, 10 times). If Cb≦CT, the process advances to step S23, and if Cb>CT, the process advances to step S25.

At step S23, in order to set the control state to EPS control, the EPS fixation flag is set and the process advances to step S24. The EPS fixation flag is reset when the ignition is turned off.

At step S24, the EPS control calculation is carried out and it goes on to Return. In other words, in order to carry out EPS control, the calculation is not carried out by the steering reaction force controller 5, and the control command value for the steered portion actuator 4 is calculated by the steered portion controller 6. In addition, if SBW has been carried out at this point, the backup clutch 9 is engaged.

At step S25, following a determination in step S22 that Cb>CT, elapsed time is measured by the timer TO and it goes on to Return.

At step S26, following a determination in step S21 that TO≦Tb, the timer TO that measures the elapsed time is cleared because the predetermined time Th is passed and the process advances to step S27.

At step S27, the counter CT for the number of switches between SBW control and EPS control is cleared because the number of switches CT between SBW control and EPS control did not exceed the predetermined number Cb within the predetermined time, and it goes on to Return.

Figure 2:
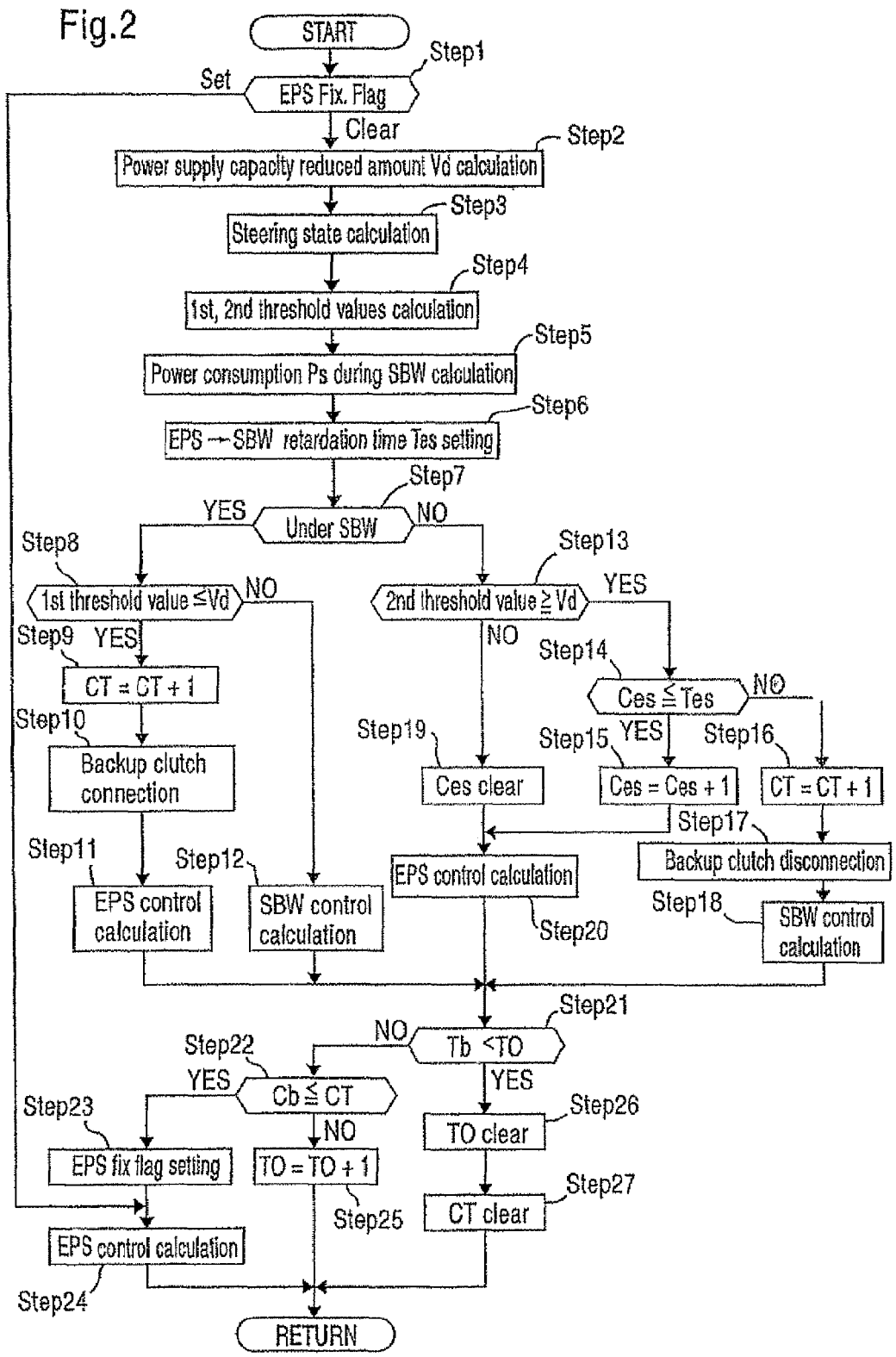
FIG. 2 is a flowchart showing a control switching process executed by a steering reaction force controller and a steered portion controller of FIG. 1.
Figure 3:
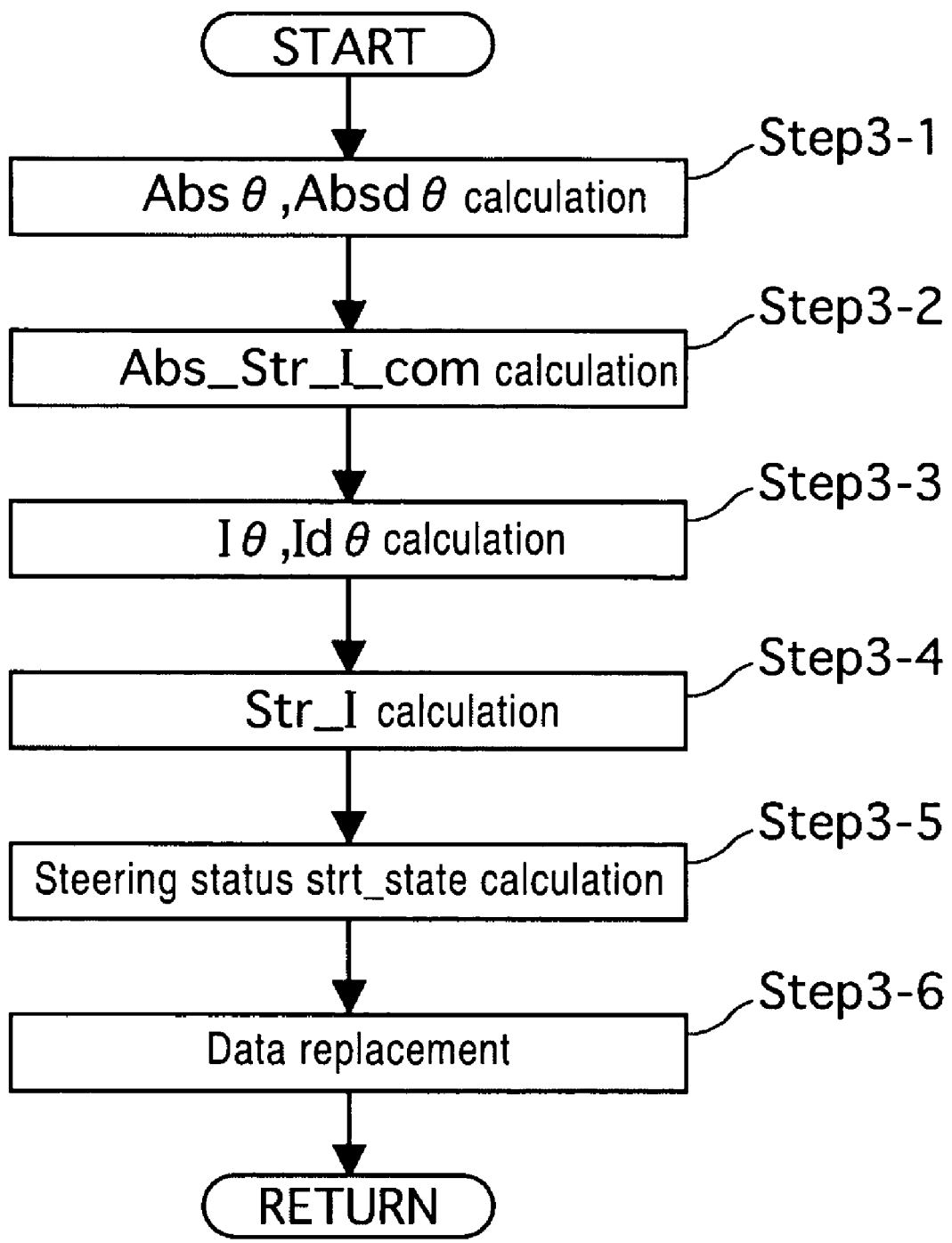
FIG. 3 is a flowchart showing a steering status calculation process.
Figure 4:
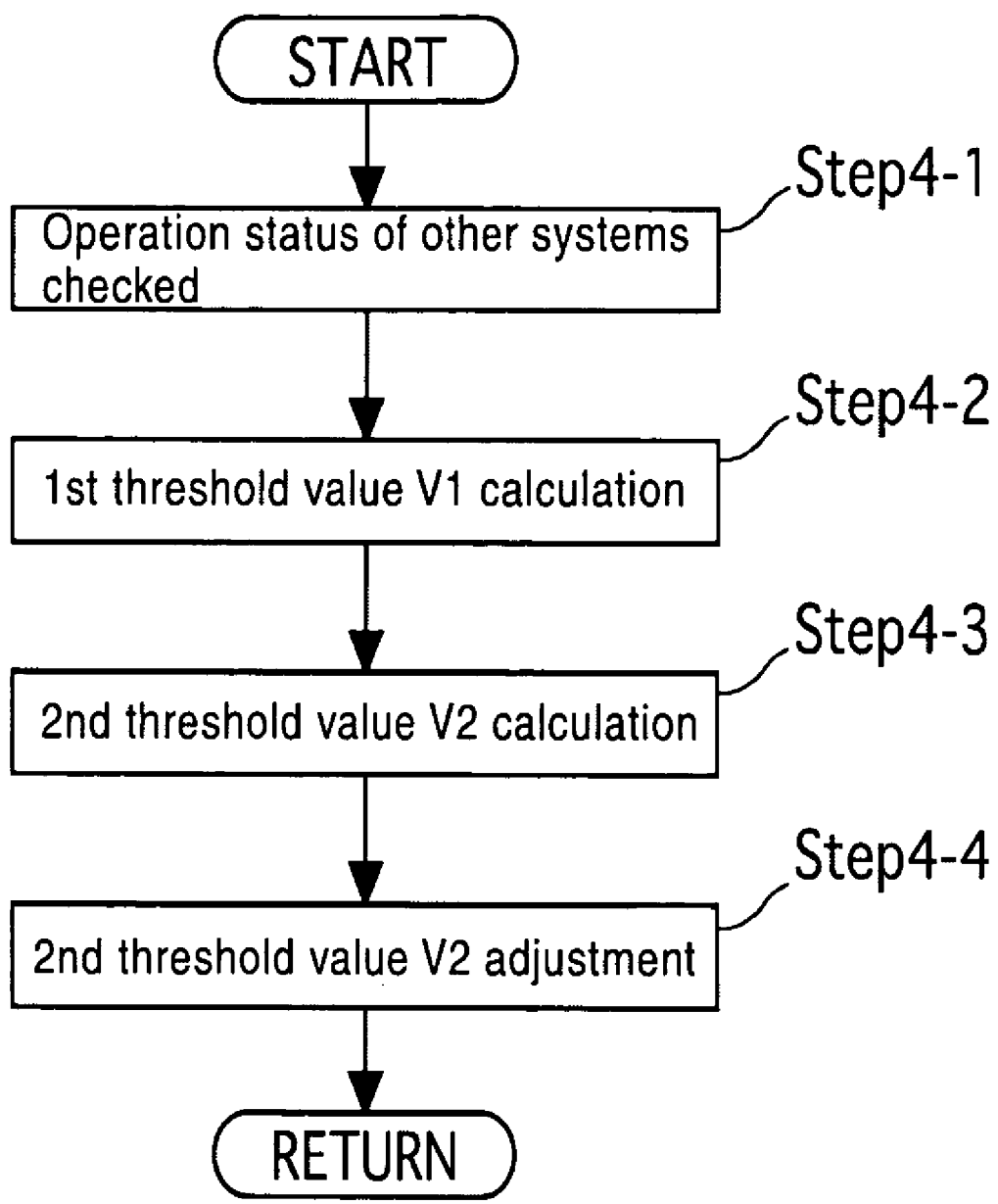
FIG. 4 is a flowchart showing a calculation process for first and second threshold values.
Figure 5:
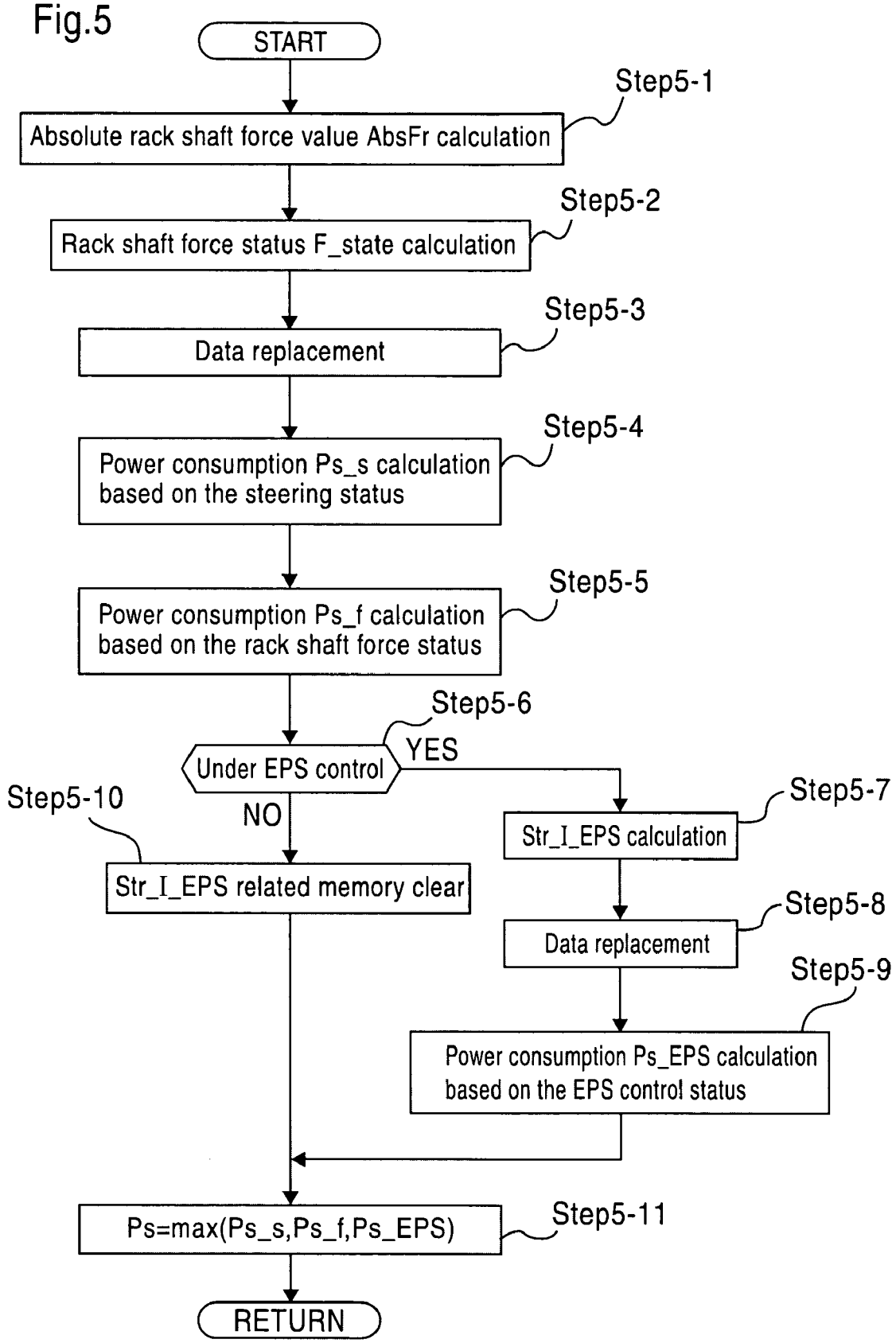
FIG. 5 is a flowchart showing a calculation process for estimated power consumption during the use of SBW.

First, when the power supply capacity reduction amount Vd is smaller than the first threshold value V1 and there is enough power supply capacity, the process advances, for example, from step S1→step S2→step S3→step S4→step S5→step S6→step S7→step S8→step S12 in the flowchart of FIG. 2. At step S12, the SBW control calculation is carried out and SBW control continues.

Then due to power consumption, if the power supply capacity reduction amount Vd becomes the same as or greater than the first threshold value V1, the process advances, for example, from step S1→step S2→step S3→step S4→step S5→step S6→step S7→step S8→step S9→step S10→step S11 in the flowchart of FIG. 2. At step S10, the backup clutch 9 is engaged, and at step S11, the switch is made from the SBW control calculation to the EPS control calculation, and thus, the switch is made from SBW control to EPS control.

Next, even though switched to EPS control, if the power supply capacity reduction amount Vd is larger than the second threshold value V2, the process advances for example from step S1→step S2→step S3→step S4→step S5→step S6→step S7→step S13→step S19→step S20 in the flowchart of FIG. 2. At step S20, the EPS control calculation is carried out and EPS control continues.

When the reduction amount for the power supply capacity Vd reaches the second threshold value V2 or lower during EPS control, the process advances, for example, from step S1→step S2→step S3→step S4→step S5→step S6→step S7→step S13→step S14→step S15→step S20→in the flow chart of FIG. 2. At step S14, it is determined whether or not the elapsed time CeS since the point it reached Vd≦V2 exceeds the retardation time TeS. Until the elapsed time CeS exceeds the retardation time TeS, the process advances to step S20 and EPS control continues.

When the power supply capacity reduction amount Vd becomes the same as or less than the second threshold value V2 during EPS control and the elapsed time CeS from the time it becomes Vd≦V2 exceeds the retardation time TeS, then the process advances, for example, from step S1→step S2→step S3→step S4→step S5→step S6→step S7→step S13→step S14→step S16→step S17→step S18 in the flowchart of FIG. 2. At step S17, the backup clutch 9 is disengaged, and at step S18 the switch is made from the EPS control calculation to the SBW control calculation and the system returns back from EPS control to SBW control.

When there is no frequent switching between SBW control to EPS control, the process advances from any one of step S11, step S12, step S18, or step S20 to step S21→step S22→step S25→Return, or step S21→step S26→step S27→Return in the flowchart of FIG. 2. The switching between SBW control and EPS control is carried out based on the power supply reduction amount Vd.

However, when there is frequent switching between SBW control and EPS control and the counter CT that is the number of switches between SBW control and EPS control becomes the same as or greater than the predetermined number Cb before the time TO passes the predetermined time Th, then the process advances from any one of step S11, step S12, step S18, or step S20 to step S21→step S22→step S23→step S24→Return in the flowchart of FIG. 2. At step S23 the EPS fixation flag is set, and at step S24 the EPS control calculation is carried out. From the next control cycle, the procedure from step S1→step S24→Return will be repeated because the EPS fixation flag is set, and EPS control continues.

Conventionally, it is not considered a reduction of the power supply capacity of a vehicle. Therefore, operability may be reduced due to a delay in the operative reaction of the steering reaction force actuator and the steered portion actuator during SBW control.

As described above, with a SBW system, there may be deterioration of the responsiveness of the actuators. Therefore, as with detection of an abnormality in the steering reaction force actuator, switching to EPS control, which consumes less power, by activating the mechanical backup system can be considered as described in FIG. 12.

Figure 12:
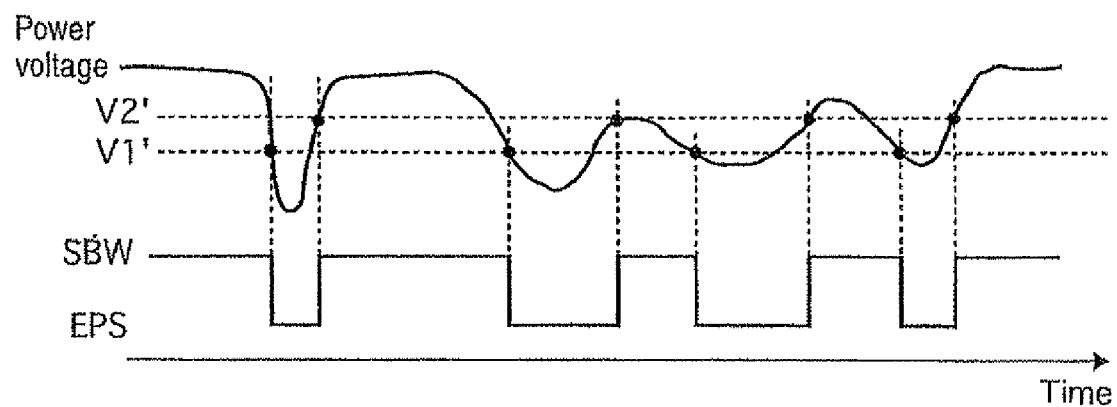
FIG. 12 is a time chart showing switching between SBW control and EPS control when the power voltage is changed.

In the case of a temporary reduction of the power voltage, it is possible to return back to SBW control and therefore a control method was considered in which when the power voltage is reduced to the same as or less than the first threshold value V1', the system moves from SBW control to EPS control, and when it becomes the same as or greater than the second threshold value V2'(>V1'), it returns back from EPS control to SBW control. As described above, a determination to return back to SBW control is carried out only according to the magnitude of the power voltage, as shown in FIG. 12, and it repeats the operation so that when it returns back to SBW control the power voltage is reduced and it is switched back to EPS control.

Figure 13:
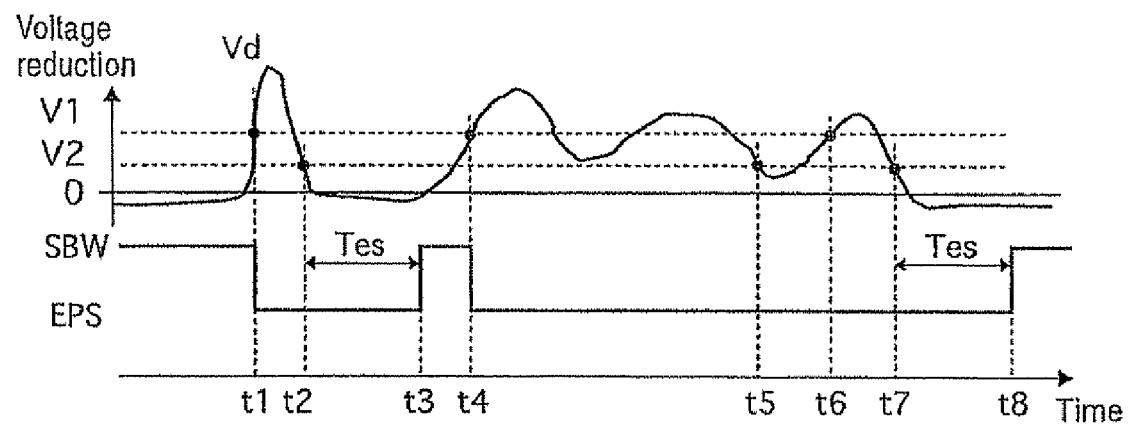
FIG. 13 is a time chart showing switching between SBW control and EPS control when the amount of power supply capacity reduction is changed.

In addition, the switching operation between SBW control and EPS control due to changes in the power supply capacity reduction amount can be adapted, too, as shown in FIG. 13. In FIG. 13 the x axis indicates the time and it shows the status of the power supply capacity reduction amount Vd, the status of the first threshold value, the status of the second threshold value V2, and the control status (SBW control or EPS control).

At the time t1 in FIG. 13, when the power supply capacity reduction amount Vd becomes the same as or greater than the first threshold value V1, the backup clutch 9 is engaged and the system is switched from SBW control to EPS control. Due to the switching to EPS control the power consumption is reduced, and at the time t2, the power supply capacity reduction amount Vd becomes the same as or less than the second threshold value V2; however, the system is not returned back from EPS control to SBW control until the retardation time TeS passes. In other words, at the time t3, a condition in which the power supply capacity reduction amount Vd is the same as or less than the second threshold value V2 continues for the period of the retardation time TeS, and therefore the backup clutch is disengaged and the system returns back from EPS control to SBW control.

At the time t4, when the power supply capacity reduction amount Vd becomes the same as or greater than the first threshold value V1 due to the additional increase in power consumption, the backup clutch 9 is engaged and the system is switched from SBW control to EPS control. At the time t5, the power supply capacity reduction amount Vd becomes the same as or less than the second threshold value V2; nonetheless, the power supply capacity reduction amount Vd becomes the same as or greater than the first threshold value V1 at the time t6, which is before the point at which the retardation time TeS has elapsed, and therefore EPS control is continued during this period. In other words, the system is switched back from EPS control to SBW control after waiting for lapse of the retardation time TeS, and therefore unnecessary switching between SBW control and EPS control can be avoided.

At the time t7, the power supply capacity reduction amount Vd becomes the same as or less than the second threshold value V2 and the retardation time TeS has passed while it maintains the value that is the same as or less than the second threshold value V2, and therefore, the system is switched back from EPS control to SBW control at the time t8, which is the time at which the retardation time TeS has passed since time t7. Here, the first threshold value V1, the second threshold value V2, and the retardation time TeS when the system is switched back from EPS control to SBW control are, as explained in connection with steps S3 to S6 in the flowchart of FIG. 2, configured in correspondence with the steering status, the control status, and the status of the other systems, etc.

As described above, the illustrated embodiment has a structure such that the first threshold value V1, the second threshold value V2, and the retardation time TeS, when the system is switched back from EPS control to SBW control are configured in correspondence with the steering status, the control status, and status of the other systems, etc. When the power supply capacity reduction amount Vd is the same or greater than the first threshold value V1, the system is switched from SBW control to EPS control, and when a state in which the power supply capacity reduction amount Vd is the same as or less than the second threshold value V2 and continues for the retardation time TeS, the system is switched back from EPS control to SBW control. Therefore any sense of discomfort from frequent switching between SBW control and EPS control is limited, while safety is maintained during the power voltage changes, allowing effective employment of SBW control.

In addition, if the switching between SBW control and EPS control is frequent and the counter CT for the number of switches between SBW control and EPS control becomes the same as or greater than the predetermined number Cb before the time TO surpasses the predetermined time Th, then as described above, the EPS fixation flag is set and EPS control continues. By doing so, when the system determines that there is a possibility of deterioration of the battery, control can be fixed at EPS control, which has less power consumption, and therefore, security can be ensured and any sense of discomfort due to frequent switching of the control status can be limited.

With the steering control device according to illustrated embodiment, the effects that are listed as follows can be obtained. (1) It is a steering control device in which a steering portion having an electric steering reaction force actuator 2 and a steered portion having an electric steered portion actuator 4 are mechanically disconnectable and connectable via backup means 8 and 9, which is comprised of: a SBW control means that disconnects the backup means 8 and 9 and carries out SBW control using the control of the steered portion actuator 4 that sets a steered angle that corresponds to the steering condition and a control for the steering reaction force actuator 2 that adds a steering reaction force that corresponds to the steered condition; an EPS control means that connects the backup means 8 and 9 and carries out EPS control using at least one from the steering reaction force actuator 2 or the steered portion actuator 4; a control switching means that switches to the EPS control using the EPS control means when a certain condition is established during SBW control using the SBW control wherein it is provided with a power supply capacity estimating means (step S2) that estimates the power supply capacity of the vehicle and it is characterized in that the control switching means switches to the EPS control when the power supply capacity is reduced to a set value or lower during the SBW control and therefore when the power supplying capacity of a vehicle is reduced, to a set value or lower during the SBW control and therefore when the power supplying capacity of a vehicle is reduced, it can limit the power consumption while maintaining a good responsive operatability.

(2) It is comprised of: a first threshold value setting means (step 4-2) that sets a first threshold value V1 for switching from the SBW control to the EPS control; and a second threshold value setting means (step 4-3) that sets a second threshold value V2 for switching from the EPS control to the SBW control being characterized in that: the control switching means switches to the EPS control when the power supply capacity reduction amount Vd becomes the same as or greater than the first threshold value V1 during the SBW control, and switches back to the SBW control when the power supply capacity reduction amount becomes the same as or less than a second threshold value V2, which is a smaller value than the first threshold value V1 during the EPS control. And therefore, due to the hysteresis of the first threshold value V1 and the second threshold V2, it prevents control switching hunting and secures the return back to SBW control and thus, it does not necessarily limit the SBW control.

(3) It is comprised of a steering status index detection means (step S3-5) that detects the steering status index value Str_State that reflects the steering status before a designated time at the steering portion being characterized in that the first threshold value setting means (step S4-2) sets a smaller first threshold value V1 as the steering status index value Str_State gets larger. And therefore, it can switched to EPS control with its small power consumption at an early point when it is estimated that a condition with a large power consumption will continue due to the steering condition (steering angle and steering speed, etc.).

(4) It is comprised of a steering status index detection means (step S3-5) that detects the steering status index value Str_State that reflects the steering status prior to the designated time at the steering portion being characterized in that the second threshold value setting means (step S4-3) sets a smaller second threshold value V2 as the steering status index value Str_State gets larger. And therefore, it can delay switching back to SBW control with its large power consumption when it is estimated that a condition with a large power consumption will continue due to the steering condition (steering angle and steering speed, etc.)

(5) It is comprised of a system operation status detection means (step S4-1) that detects the operation status of other electronically operated systems equipped in the vehicle being characterized in that the second threshold value setting means (step S4-4) makes an adjustment to make the second threshold value V2 smaller when there are more operations by other electrically operated systems. And therefore, it can delay the switching back to SBW control with its large power consumption when it is estimated there is a condition with a large power consumption due to a large number of operations by other systems.

(6) It is comprised of a retardation time setting means (step S14) that sets the retardation time TeS for switching from the EPS control to the SBW control being characterized in that the control switching means makes it return to the SBW after a configured retardation time TeS from the moment when the power supply capacity reduction amount Vd becomes the same as or less than the second threshold value V2 during EPS control. And therefore, even if the power voltage is reduced because it is switched back to SBW control, the power voltage recovers for a portion of the retardation time, and thus, it can prevent switching back to EPS control immediately after returning back to SBW control.

(7) It is comprised of a power consumption estimation means (step S5) that estimates the power consumption Ps during the SBW control being characterized in that the retardation time setting means (step S14) configures a greater retardation time TeS as the estimated power consumption Ps becomes greater. And therefore, it can prevent switching back to EPS control immediately after returning back to SBW control due to the immediate reduction of the power voltage.

(8) It is comprised of a steering status index detection means (step S3-5) that detects the steering status index value Str_State that reflects the steering status prior to the designated time at the steering portion being characterized in that the power consumption estimation means (step S5) estimates a larger power consumption Ps_s as the steering status index value Str_State becomes larger. Therefore, it can expect the power consumption Ps_S, which takes the type of driving into account. In other words, for those types of driving with relatively little steering such as on a highway, the power consumption is small, and for those types of driving with frequent steering such as on a winding road, the power consumption increases.

(9) It is comprised of a steered portion torque status index value detection means (step S5-7) that reflects the steered portion torque condition prior to the designated time at the steered portion being characterized in that the power consumption estimation means (step S5) estimates a larger power consumption Ps_f as the steered portion torque status index value F_State becomes larger. And thus, the precision of the estimation for the power consumption can be improved even under conditions where power is consumed without having changes in the steering status, in other words, in the event power for a disturbance is generated under conditions such that a disturbance is added during straight driving.

(10) It is comprised of an electric current command value status index value detection means (step S5-7) that detects the electric current command value status index value Str_I_EPS that reflects the electric current command status for the steered portion actuator 4, prior to the designated time during EPS control, being characterized in that the power consumption estimation means (step S5) estimates a larger power consumption Ps_EPS as the electric current command value status index value Str_I_EPS becomes greater, and thus it allows the addition of the actual load from the road surface and therefore the power consumption can be estimated with great precision.

(11) It is comprised of a number of control switching detection means (steps S9 and S16) that detect the number of switches between the SBW control and the EPS control being characterized in that the control switching means fixes the control to the EPS control thereafter when the number of control CT switches reaches a set number Cb or greater within a set time period Tb. And therefore, when it is determined that the deterioration of the battery may be advanced, the control status can be fixed to EPS, whic has a smaller power consumption and therefore, the safety can be secured and the sense of discomfort due to frequent switching of the control status can be limited.

In accordance with the illustrated embodiment, when the power supply capacity reduction amount Vd is the same as or greater than the first threshold value V1, the system is switched from SBW control to EPS control, and when the power supply capacity reduction amount Vd is the same as or less than the second threshold value and continues for the period of the retardation time TeS, the system is switched back from EPS control to SBW control. Nonetheless, it is acceptable that when the power supply capacity reduction amount Vd is the same as or greater than the first threshold value V1, the system only switches from SBW control to EPS control. The present steering control device includes any embodiments which switch to steering assistance control when the estimated power supplying capacity is reduced to a set value or lower during the steer-by-wire control.

In the illustrated embodiment, the first threshold value V1', which is a threshold value for switching from SBW control to EPS control, and the second threshold value V2', which is a threshold value for switching from EPS control to SBW control, are established with a relationship of V2'>V1'. Nonetheless, for example, the threshold value for switching from SBW control to EPS control and from EPS control to SBW control can have the relationship of V1'=V2', only one threshold can be configured. The retardation time TeS can be configured to be a longer time compared to that of the illustrated embodiment. Or, it can be achieved for example, by having two sets each of threshold values for switching from SBW control to EPS control and from EPS control to SBW control, and the hysteresis width between the two threshold values may be used to configure a delay for the switching.

In the illustrated embodiment, the first threshold value V1, the second threshold value V2 and the retardation time TeS that returns EPS control back to SBW control are configured depending on the steering condition, control, condition and the condition of other systems; nonetheless, the present steering control device extends to embodiments having variable values using parameters other than those disclosed in connection with the illustrated embodiment, or having a constant value that is set in advance.

The steering control device has been disclosed as being applied to a steer-by-wire system using a mechanical backup system and a backup clutch as backup means; nonetheless, it can be applied to a steer-by-wire system other than that of the illustrated embodiment, as long as it is a system having backup means that allows a mechanical connection and disconnection between the steering portion and steered portion.

Accordingly, while the present steering control device has been shown and described in connection with a certain specific embodiment thereof, this is by way of illustration and not of limitation, and the appended claims should be construed as broadly as the prior art will permit.

What is claimed is:

1. A steer-by wire control system comprising:
    a steering portion that is operated by a driver;
    steered wheels that are mechanically disconnected from the steering portion;
    a steered portion actuator to operate the steered wheels;
    a steering reaction force actuator to apply a steering reaction force to the steering portion;
    a backup apparatus that can connect mechanically the steering portion and the steered wheels;
    a power voltage supplier to supply electrical power to the steered portion actuator; and
    a controller that is applied to control the steered portion actuator, the steering reaction force actuator, and the backup apparatus; wherein
        the controller is configured to control the steered portion actuator to set a steered angle corresponding to a steering condition of the steering portion,
        the controller is configured to control the steering reaction force actuator to add a steering reaction force corresponding to a steered condition,
        the controller is configured to connect mechanically the steering portion and the steered wheels by the backup apparatus to perform steering assistance control when a power supply capacity of the power voltage supplier is reduced by a first threshold value or greater during steer-by wire control, the steer-by-wire control occurring when the steered wheels are mechanically disconnected from the steering portion, and
        the controller is further configured to set a second threshold value for disconnecting the backup apparatus to mechanically separate the steering portion and the steered wheels, wherein the first threshold value is equal to the second threshold value or is greater than the second threshold value.

2. A steer-by wire control system according to claim 1, wherein
    the controller is further configured to control the at least one of the steering reaction force actuator and the steered portion actuator to add a steering aid force when the steering portion and the steered wheels are connected by the backup apparatus.

3. A steer-by wire control system according to claim 1, wherein the first threshold value and the second threshold value are voltage reduction levels of the power voltage supplier.

4. A steer-by wire control system according to claim 1, wherein the controller is further configured to detect a steering status index value reflecting a steering status at the steering portion before a predetermined time; and
    the controller is further configured to set the first threshold value to a smaller value as the steering status index value becomes greater.

5. A steer-by wire control system according to claim 1, wherein the controller is further configured to detect a steering status index value reflecting a steering status at the steering portion prior to a predetermined time; and wherein the controller is further configured to set the second threshold value to a smaller value as the steering status index value becomes greater.

6. A steer-by wire control system according to claim 1, wherein the controller is further configured to detect an operational status of electrically operated systems in a vehicle other than steering control; and
   wherein the controller is further configured to reduce the second threshold value as operation of the electrically operated systems in the vehicle other than the steering control increases.

7. A steer-by wire control system according to claim 1, wherein the controller is further configured to set a retardation time for switching from the steering assistance control to the steer-by-wire control; and
   wherein the controller is further configured to return to the steer-by-wire control after a time measured from the moment when the power supply capacity becomes the same as or less than the second threshold value during steering assistance control reaches the retardation time.

8. A steer-by wire control system according to claim 7, wherein the controller is further configured to estimate the power consumption during the steer-by-wire control; and
   wherein the controller is further configured to set a greater retardation time as the estimated power consumption becomes greater.

9. A steer-by wire control system according to claim 8, wherein the controller is further configured to detect a steering status index value reflecting a steering status at the steering portion prior to a predetermined time; and
   wherein the controller is further configured to estimate a larger power consumption as the steering status index value becomes larger.

10. A steer-by wire control system according to claim 8, wherein the controller is further configured to set a steered portion torque status index value that reflects a steered portion torque condition at the steered portion prior to a predetermined time; and
    wherein the controller is further configured to estimate a greater power consumption as the steered portion torque status index value becomes larger.

11. A steer-by wire control system according to claim 8, wherein the controller is further configured to detect an electric current command value status index value reflecting an electric current command status for the steered portion actuator prior to a predetermined time during steering assistance control; and
    wherein the controller is further configured to estimate a greater power consumption as the electric current command value status index value becomes greater.

12. A steer-by wire control system according to claim 1, wherein the controller is further configured to detect the number of switches between the steer-by-wire control and the steering assistance control; and
    wherein the controller is further configured to continue the steering assistance control when the number of control switches reaches a predetermined number or greater within a predetermined period of time.

13. A steering control device of a vehicle in which a steering portion having an electric steering reaction force actuator and a steered portion having an electric steered portion actuator are mechanically disconnectable and connectable via a backup apparatus, the device comprising:
    steer-by-wire control means for disconnecting the backup apparatus and performing steer-by-wire control using control of the steered portion actuator to set a steered angle corresponding to a steering condition and using control of the steering reaction force actuator to add a steering reaction force corresponding to a steered condition; and
    steering assistance control means for connecting the backup apparatus and performing steering assistance control by adding a steering aid force using at least one of the steering reaction force actuator and the steered portion actuator;
    means for triggering the steering assistance control means to switch to the steering assistance control if a power supply capacity of the vehicle reaches a first predetermined value or below during the steer-by-wire control; and
    means for triggering the steer-by-wire control means to switch to the steer-by-wire control if the power supply capacity reaches a second predetermined value or above during the steering assist control wherein the second predetermined value is greater than the first predetermined value.

14. A steering control device according to claim 13 wherein the first predetermined value and the second predetermined value are measured voltage levels.

15. A steering control device of a vehicle in which a steering portion having an electric steering reaction force actuator and a steered portion having an electric steered portion actuator are mechanically disconnectable and connectable via a backup apparatus, the device comprising:
    steer-by-wire control means for disconnecting the backup apparatus and performing steer-by-wire control using control of the steered portion actuator to set a steered angle corresponding to a steering condition and using control of the steering reaction force actuator to add a steering reaction force corresponding to a steered condition; and
    steering assistance control means for connecting a backup apparatus and performing steering assistance control by adding a steering aid force using at least one of the steering reaction force actuator and the steered portion actuator;
    means for triggering the steering assistance control means to switch to the steering assistance control if a power supply capacity of the vehicle is reduced by a first threshold value or greater during the steer-by-wire control; and
    means for setting a second threshold value for triggering the steer-by-wire control means to switch to the steer-by-wire control wherein the first threshold value is equal to or is greater than the second threshold value and the first threshold value and the second threshold value are reduction amounts of the power supply capacity.

* * * * *